Jan. 18, 1938.  E. STIFT  2,105,560
BRAKE MECHANISM
Filed Dec. 30, 1935
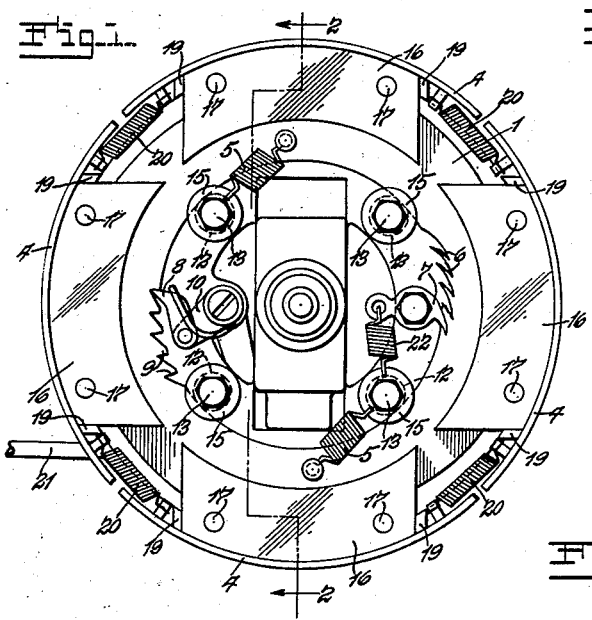
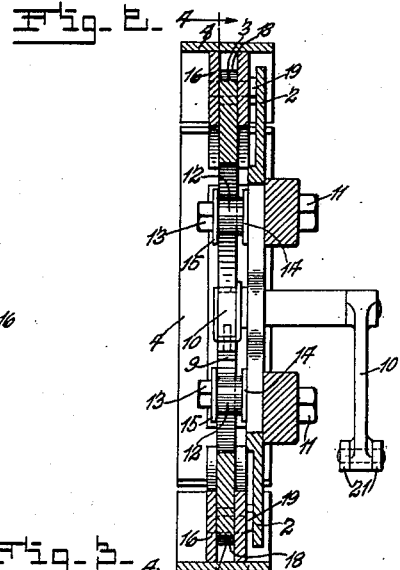
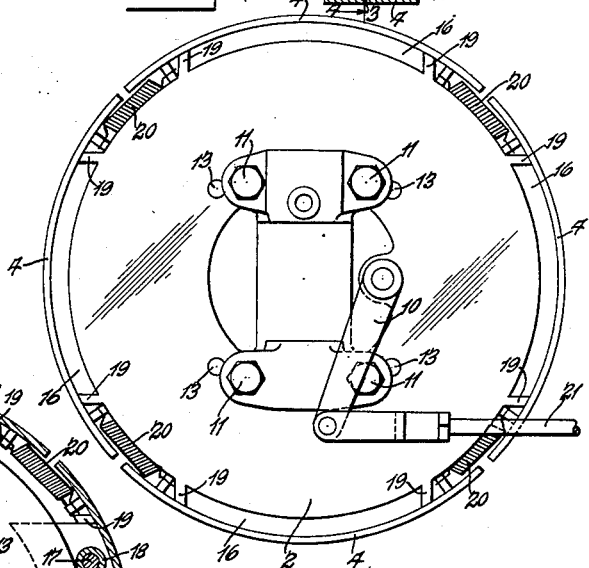
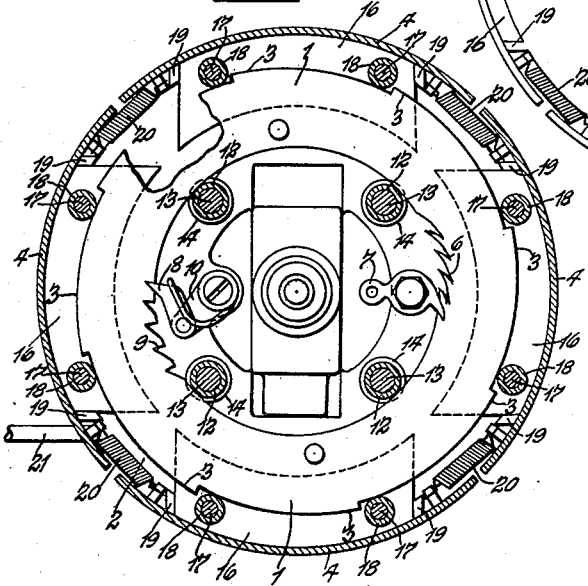
Inventor
Edward Stift
by Rupsey & Cassidy
His Attorneys Patented Jan. 18, 1938

2,105,560

UNITED STATES PATENT OFFICE 2,105,560

BRAKE MECHANISM

Edward Stift, St. Louis, Mo.

Application December 30, 1935, Serial No. 56,618

5 Claims. (Cl. 188—79.5)

This invention relates to brake mechanism for vehicles and more particularly brakes of the internal expansion type.

An object of this invention is to provide brake mechanism simple in construction and efficient in operation, which will expand brake shoes positively in a radial direction to secure uniform contact with a cooperating surface, or brake drum, throughout the entire surface of the brake shoes and which will be self-adjusting to automatically provide a certain minimum and a certain maximum clearance between the brake shoes and the cooperating surface.

Other and specific objects will be apparent from the following detail description taken in connection with the accompanying drawing.

Fig. 1 is a front elevation of brake mechanism embodying my invention;

Fig. 2 is a vertical section approximately on line 2—2, Fig. 1;

Fig. 3 is a rear elevation; and

Fig. 4 is a vertical section approximately on line 4—4, Fig. 2.

A cam ring 1 is mounted for rotation on a support 2 and has a plurality of cam surfaces 3 about its periphery. A plurality of brake shoes 4 are mounted about the periphery of the ring and are adapted to be pressed outwardly by the cam surfaces 3 upon rotation of the ring. Springs 5 connected between the ring 1 and the support 2 return the ring to and tend to hold it in a fixed normal position. This normal position is automatically fixed by mechanism comprising undercut teeth 6 on the inner surface of the ring and a spring pressed pawl 7 pivotally mounted on the support 2. The cam ring 1 is rotated by a ratchet mechanism comprising a pawl 8 and a ratch 9, the pawl being carried by a bell crank lever 10 pivotally mounted on the support 2.

The foregoing comprises a summary of the embodiment of the invention specifically illustrated in the accompanying drawing. The essential features of the invention are pointed out in the appended claims but the following detail description will assist in understanding and practicing the invention.

The support 2, as specifically shown, comprises a plate which is fixed to an axle or axle housing. A front automobile axle is shown in the drawing, the support 2 being attached thereto by screws 11. The cam ring 1 is mounted for rotation on the support 2 by having its inner circumference bearing on rollers 12 which are supported by studs 13 secured to the support 2. Inner washers 14 and outer washers 15 on the studs 13 engage the faces of the ring 1 and properly space and hold the ring against axial displacement.

Each of the brake shoes 4 has a pair of inwardly extending flanges 16. Pins 17 secured in the flanges 16 carry rollers 18, which ride the periphery of the cam disc 1 and which are engaged by a cam surface 3. In the specific embodiment shown four brake shoes are provided, each having two rollers 18 and there being eight cam surfaces on the ring.

The brake shoes are held against circumferential movement by lugs 19, which are secured to or integral with the support 2 and extend inwardly to engage the edges of the flanges 16.

The flanges 16 on the respective brake shoes 4 provide rigidity for the shoes which are moved outwardly as a unit in a radial direction by the action of the cam ring 1. The side edges of the flanges 16 are straight and are parallel to the radius of movement so that lugs 19 contacting those edges serve as guides for the shoes, restraining the shoes from movement in a circumferential direction and thereby prevent chattering of the brake.

Springs 20 connect adjacent ends of the brake shoes 4 and contract the brake shoes when the cam disc is rotated to normal position.

In the operation of the device the bell crank lever 10 is rotated by a rod 21, which may be connected to a foot pedal or lever not shown. The pawl 8 being engaged in a notch in the ratch 9 will rotate the cam disc 1 in a clockwise direction (Figs. 1 and 4). The cam surfaces 3, bearing against the rollers 18, press the brake shoes outwardly uniformly throughout their entire surface to contact a cooperating surface which may be the inner circumference of a brake drum, not shown but well understood in the art. If the clearance between the brake shoes in their starting position and the brake drum is excessive due to wear or for other reasons the ring 1 will be rotated by the ratchet such a distance that the pawl 7 will be urged by its spring 22 into a succeeding notch 6. Upon release of the rod 21, the springs 5 will rotate the cam disc 1 in a counter-clockwise direction with the springs 20 contracting the brake shoes 4 while the rollers 18 ride the cam surfaces 3. The teeth 6 being undercut provide a sufficient rotation of a cam disc 1 in a counter-clockwise direction so as to allow a fixed minimum clearance between the brake shoes and the cooperating drum. This clearance will be in actual practice at least .01 inch. It will be seen that the function of the pawl 7 and the undercut teeth 6 is to fix a normal position for the cam disc 1 so as to automatically adjust the clearance between the brake shoes and its cooperating drum.

It will be understood that various changes may be made in the details of construction, within the scope of the appended claims, without departing from the spirit of this invention.

I claim:

1. In brake mechanism, a cam ring positioned and adapted when rotated to expand brake shoes, and means for automatically fixing a normal position of said ring including undercut teeth on the ring and a spring pressed pawl for engaging the teeth.

2. In brake mechanism, a cam ring positioned and adapted when rotated to expand brake shoes, a ratch on the ring, a lever, a pawl carried by the lever engaging the ratch, and means for automatically fixing a normal position of the ring including undercut teeth on the ring and a spring pressed pawl engaging the teeth.

3. In brake mechanism, the combination comprising a support, a cam ring rotatively mounted on the support, a plurality of brake shoes about the periphery of said ring and adapted to be pressed outwardly by rotation of the ring, yielding means for returning and holding the ring to and in normal position, yielding means for contracting the shoes, means for rotating the ring, and means for automatically fixing such normal position including undercut teeth on the ring and a spring pressed pawl carried by the support and engaging the teeth.

4. In brake mechanism, the combination comprising a support, a cam ring rotatively mounted on the support, a plurality of brake shoes about the periphery of said ring and adapted to be pressed outwardly by rotation of the ring, yielding means for returning and holding the ring to and in a normal position, yielding means for contracting the shoes, a ratch on the ring, a lever, a pawl carried by the lever engaging the ratch, and means for automatically fixing such normal position including undercut teeth on the ring and a spring pressed pawl carried by the support and engaging the teeth.

5. In a brake mechanism the combination comprising a support, a plurality of rigid brake shoes, a pair of inwardly extending flanges on each of said shoes and spaced from each other, a pair of rollers journalled between the flanges on each shoe, a ring mounted on the support and having a cam surface on its outer periphery arranged and adapted to contact all of said rollers and thereby upon rotation to press the shoes outwardly in a radial direction by its rotation, straight edges at the ends of the flanges parallel to the radius of movement of the shoes, and means on the support contacting said edges to restrain the shoes against circumferential movement.

EDWARD STIFT.